Figure 2:
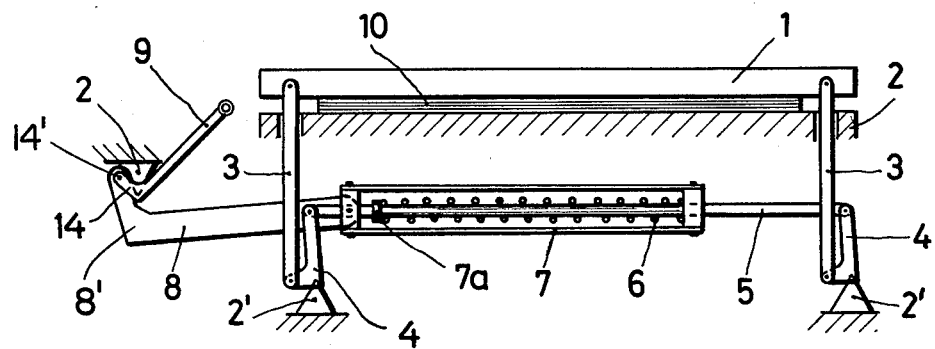

United States Patent [19]

Stolz

[11] 4,427,190
[45] Jan. 24, 1984

[54] APPARATUS FOR PRESSURE ATTACHING CONVEYOR BELT CONNECTORS

[75] Inventor: Hermann Stolz, Muehlheim, Fed. Rep. of Germany

[73] Assignee: Mato Maschinen- und Metallwarenfabrik Curt Matthaei GmbH & Co. KG, Offenbach, Fed. Rep. of Germany

[21] Appl. No.: 300,815

[22] Filed: Sep. 10, 1981

[30] Foreign Application Priority Data

Oct. 24, 1980 [DE] Fed. Rep. of Germany ....... 3040092

[51] Int. Cl.³ ............................................. B25B 1/14
[52] U.S. Cl. ..................................... 269/32; 269/228
[58] Field of Search ............................. 269/237–239, 269/228, 254 CS, 32; 83/624–627; 100/268, 283

[56] References Cited

U.S. PATENT DOCUMENTS

| 330,929 | 11/1885 | Rust | 100/283 |
|---|---|---|---|
| 2,377,953 | 6/1945 | Matton | 269/237 |
| 2,434,328 | 1/1948 | McLane | 269/228 |
| 3,105,679 | 10/1963 | Westra | 269/32 |
| 4,340,206 | 7/1982 | McJunkin | 269/238 |
| 4,346,654 | 8/1982 | Orlowski et al. | 100/268 |

FOREIGN PATENT DOCUMENTS 1072023  6/1960  Fed. Rep. of Germany .

*Primary Examiner*—Robert C. Watson
*Attorney, Agent, or Firm*—W. G. Fasse; D. H. Kane, Jr.

[57] ABSTRACT

Clamps or connector elements (13) are secured to the ends of a conveyor belt (10) by a pressure applying clamping tool (11) which includes two clamping rails (1, 2) for clamping down the belt end prior to the attaching of the clamps. A single operating lever (9) is used for clamping the upper rail (1) down against the lower rail (2). For this purpose each end of the upper rail (1) is secured to a respective fixed point (2) by a tie rod (3) and a rocking lever (4). Each rocking lever (4) is connected to a spring biased pull rod (5) which is operatively connected to the single operating lever (9) through a toggle type connection.

4 Claims, 4 Drawing Figures

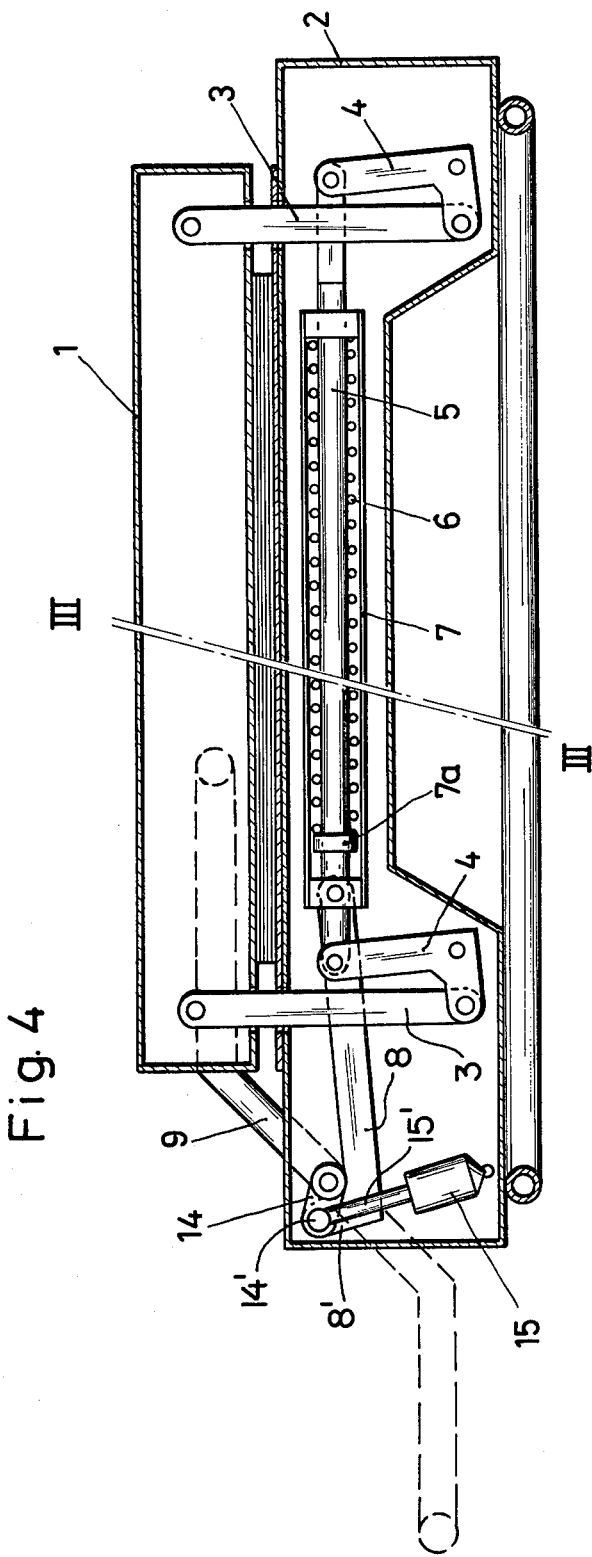

APPARATUS FOR PRESSURE ATTACHING CONVEYOR BELT CONNECTORS

CROSS-REFERENCE TO RELATED APPLICATION

The present invention is based on German Patent Application No. P 3,040,092.1, filed in the Federal Republic of Germany on Oct. 24, 1980.

BACKGROUND OF THE INVENTION

The invention relates to an apparatus for pressure attaching conveyor belt connectors in which the conveyor belt is clamped in a frame by means of a clamping device prior to the attachment of the connector elements. The clamping device holds the conveyor belt end between an upper and lower clamping rail by means of spring-loaded pressure levers.

Various types of such pressure attachment devices are known, for example, according to the German Pat. No. 1,072,023. In such known belt connecting machines, the upper clamping rail is pressed, by means of levers at its ends, against the lower clamping rail which serves as a support. Compression springs are arranged between the levers and the upper clamping rail, or pressing rod to achieve an equal application of pressure on both sides of the belt connecting machine regardless of how thick the belt is within the mouth capacity of the retaining device.

This known construction of the clamping elements has the disadvantage, however, that the clamping springs can be only of a relatively short construction, so that substantial differences in the clamping power occur when the belt thicknesses vary. A further drawback exists in that the clamping rails deflect or sag in varying amounts, so that by means of a predeflection of the clamping rail in the opposite direction a uniform clamping action cannot be achieved.

Due to these drawbacks, the known clamping devices of this type could practically find use only for connecting machines with a relatively narrow pressing-in width.

To avoid the varying deflection, it has further been suggested to arrange the two clamping elements, in machines having a larger pressing-in width, at a certain distance, for example, one quarter of their length, away from the end of the clamping rail, on a specially arranged bearing rail. By these means, the effect of differing spring forces on the deflection of the clamping rail is reduced, but the disadvantage remains that thinner belts or tapes are not clamped strongly enough, and that furthermore, now as before, two clamping elements must be handled.

A further drawback of the clamping devices known heretofore lies in that in those instances in which shorter belt pieces must be clamped asymmetrically, a tilting of the clamping rail occurs because of the lever action of the spring elements. As a result, in such cases, one and only one side or edge of the inserted conveyor belt piece is clamped.

Lastly it is a disadvantage, especially because of the use in rough underground operations, that the clamping elements and springs are arranged in the open and therefore are unprotected against damage and soiling.

OBJECTS OF THE INVENTION

In view of the above it is the aim of the invention to achieve the following objects singly or in combination:

to avoid the above outlined disadvantages of the prior art, specifically to provide a belt end clamping apparatus which may be operated by a single clamping lever;

to make sure that the belt width and belt thickness do not adversely affect the clamping so that the clamping rails extend in parallel to each other at all times to exert a uniform clamping action;

to dimension the biasing spring so that it does not have any detrimental effect on the clamping, specifically to assure a uniform clamping; and to protect substantially all of the components of the apparatus by housing these components in one of the clamping rails.

SUMMARY OF THE INVENTION

The objects of the invention are attained in that an upper clamping rail, which is movable against a lower stationary rail, is connected, by means of tie rods, rocking levers, and a spring-loaded pull rod, to a single clamping lever.

According to a further feature of the invention, a tie rod is arranged at each end of the clamping rail. Each tie rod at each end of the clamping rail is connected to the associated end of the pull rod by means of a rocking lever pivoted on the frame. The single or only clamping lever is hinged by means of a strap bar to the end of a yoke which biases a compression spring on the pull rod.

According to the invention, the clamping rails may be constructed as rectangular tubes or pipes within which the entire clamping mechanism is housed.

To prevent an unwanted release of the single clamping lever, a tiltable side bar may be arranged on the clamping lever according to the invention, which forms a self-locking toggle lever system with the strap bar.

Finally, a hydraulic brake may be coordinated with the clamping lever which on the one hand takes up the tension energy released when the lever is opened and which, in addition to the toggle lever action, secures the position of the clamping lever.

BRIEF FIGURE DESCRIPTION

Figure 1:
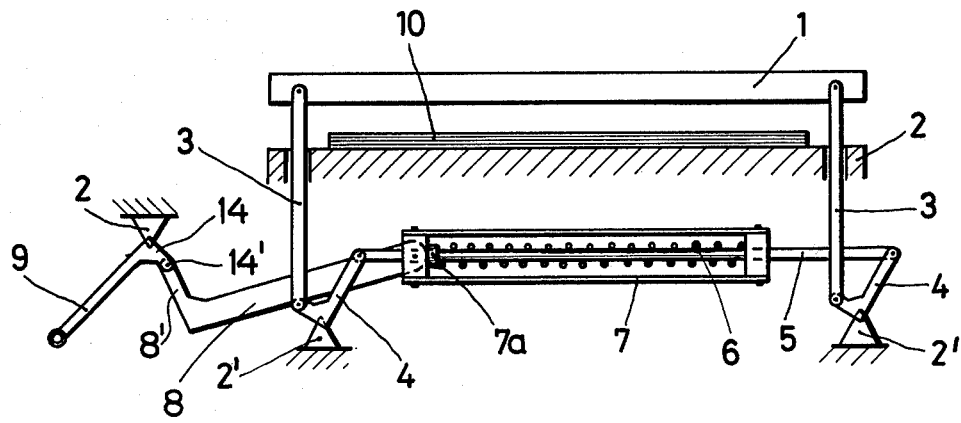
Figure 3:
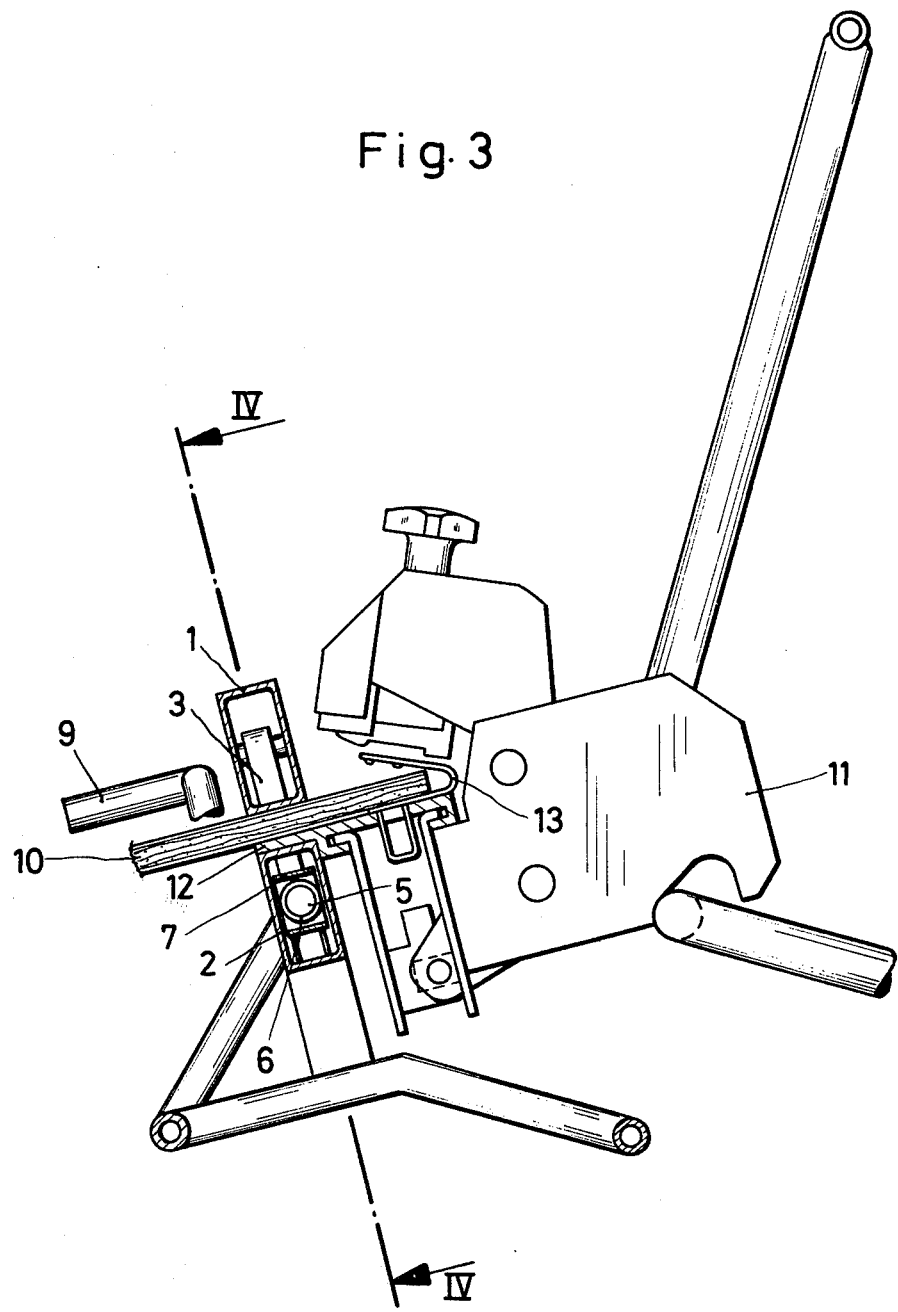

In order that the invention may be clearly understood, it will now be described, by way of example, with reference to the accompanying drawings, wherein:

FIGS. 1 and 2 show an operational view of the pressure attaching apparatus according to the invention, whereby FIG. 1 shows the uncocked condition of the clamping rails, and FIG. 2 shows the closed or cocked condition of the clamping rails; FIG. 3 shows a structural example embodiment of the invention in a view partially in section along section line III—III in FIG. 4; and FIG. 4 is a sectional view along section line IV—IV in FIG. 3.

DETAILED DESCRIPTION OF PREFERRED EXAMPLE EMBODIMENTS AND OF THE BEST MODE OF THE INVENTION

According to FIGS. 1 and 2, the present apparatus comprises an upper clamping rail 1 and a lower clamping rail 2 which serves as a support. The ends of the upper clamping rail 1 are connected, by means of two tie rods 3, to the ends of the rocking levers 4 which are supported or rather journalled in the lower clamping rail 2. The free ends of the rocking levers 4 are connected to each other by means of a pull rod 5. A tension spring 6 is arranged on this pull rod 5. The left end of this spring 6 abuts against an abutment 7a. The tension spring 6 is kept biased by a yoke 7. The strap bar 8 is hinged or pivoted to the front end of the yoke 7 located in the left part in FIGS. 1 and 2. The strap bar 8 is actuated by the single hand operated lever 9 which is also pivotally supported in the lower clamping rail 2. The bar 8 has an extension 8' pivoted to a side bar 14 at 14' as will be described in more detail below.

When the single clamping lever 9 is tilted clockwise out of the position shown in FIG. 1 to the position shown in FIG. 2, the rocking levers 4 and rotated counter-clockwise by the spring-loaded pull rod 5. In this way the tie rods 3 and with them the clamping rail 1 are pulled down until the belt end 10 is clamped between the clamping rails 1 and 2.

According to FIG. 3, which shows a sectional view along section line III—III in FIG. 4, the clamping tong 11 for installing the connector elements 13 is slidably attached to a longitudinal rail 12 which simultaneously carries the connector elements 13. The clamped belt end 10 extends into the opening in the connector elements 13. The belt end is held in the necessary position by the two clamping rails 1 and 2 which are hollow and have a rectangular cross-section as shown in FIG. 3.

FIG. 4 shows a section along section live IV—IV in FIG. 3 while omitting the parts 11-13. The upper clamping rail 1 and the lower clamping rail 2 are constructed as rectangular pipes or tubes. In this way, it is possible to arrange the entire clamping mechanism within these rectangular tubes. Only the single operating and clamping lever 9 lies outside the clamping rails. To hold the hand operated lever 9 in its respective end position and to secure it against an unwanted release, a side bar 14 is rigidly attached to the hand operated lever 9 for tilting together with the hand operated lever 9. This side bar 14 and the strap bar 8 are pivoted to each other at the pivot point 14' as shown in FIG. 4 for forming a toggle lever system which is self-locking when its pivot point 14' is moved beyond the dead point of the toggle lever system as shown in FIGS. 1 and 2. In this way an unwanted change of the respective position of the clamping rails 1 and 2, in their open (FIG. 1) as well as in thier locked (FIG. 2) positions, is prevented. Since even belts with large thickness variations may still be clamped without trouble with the arrangement according to the invention, it can occur that in the case of greater belt thicknesses the tension energy stored in the spring 6 may cause a quick backlash of the hand lever 9 when it is opened. A hydraulic brake in the form of a piston cylinder device 15 is provided to prevent a possible endangering of the operating personnel by such backlash. The free end of the piston rod 15' is pivoted at 14' to the side bar 14 whereby the piston cylinder device 15 of the hydraulic brake, on the one hand, takes up the tension energy released when the hand lever 9 is opened, and secures, on the other hand, the end positions of the toggle lever system including the strap bar 8 and the side bar 14 in the fully open and the fully closed positions of the clamping device. The cylinder of the device 15 is connected through conduits to a conventional source of hydraulic pressure such as a pump not shown.

Although the invention has been described with reference to specific example embodiments it will be appreciated that it is intended to cover all modifications and equivalents within the scope of the appended claims.

What is claimed is:

1. In an apparatus for attaching, by means of pressure, connector elements to the ends of a conveyor belt, having frame means (2'), first and second clamping rails (1, 2) one of which is movable relative to the other for clamping a belt end between the two clamping rails into a fixed position for said attaching, a clamping mechanism including rocking lever means (4) pivoted to said frame means, tie rod means (3) for movably securing said movable clamping rail (1) to the rocking lever means (4), pull rod means (5), means (6, 7) including biasing spring means (6) operatively connected to said rocking lever means (4), the improvement comprising a single clamping lever (9) and toggle means having a dead point operatively connecting said single clamping lever (9) to said pull rod means (5) for clamping and releasing said movable rail relative to the other rail, at least one of said clamping rails being hollow, said clamping mechanism being mounted inside said hollow clamping rail, and wherein said toggle means comprise a first toggle member (8) forming a tensioning bar for said spring means (6) and a second toggle member (14) having its one end rigidly connected to said single clamping lever (9) and its other end pivoted (at 14') to said first toggle member (8), said first and second toggle members (8 and 14) being so positioned relative to each other that said pivoted end (14') is moved beyond the dead point of the toggle means for self-locking of the toggle means which prevents an unwanted release of the single clamping lever (9) and for a self-locking closing of the clamping mechanism.

2. The apparatus of claim 1, further comprising hydraulic brake means (15) pivoted to said single clamping lever (9) through said toggle means at said pivoted end (14') of said second toggle member (14) for braking any sudden return movement of said single clamping lever (9).

3. The apparatus of claim 1, wherein said hydraulic brake means operatively connected to said single clamping lever (9) is housed in said one hollow clamping rail.

4. The apparatus of claim 1, wherein both clamping rails are hollow tubular members each having a rectangular cross-section.

* * * * *